No. 771,640. PATENTED OCT. 4, 1904.
W. R. HOWE.
VEHICLE TIRE.
APPLICATION FILED JULY 9, 1900.
NO MODEL.

Witnesses.
Clarence E. Mehlhope.
R. P. Hargitt.

Inventor.
William R. Howe
by Alfred M. Allen
Attorney.

No. 771,640.

Patented October 4, 1904.

UNITED STATES PATENT OFFICE.

WILLIAM R. HOWE, OF NEW YORK, N. Y.

VEHICLE-TIRE.

SPECIFICATION forming part of Letters Patent No. 771,640, dated October 4, 1904.

Application filed July 9, 1900. Serial No. 22,891. (No model.)

*To all whom it may concern:*

Be it known that I, WILLIAM R. HOWE, a citizen of the United States, residing in New York, in the county of New York and State of New York, have invented a certain new and useful Improvement in Vehicle-Tires, of which the following is a full, clear, and exact description, reference being had to the accompanying drawings, forming part of this specification.

Heretofore rubber tires have been secured to the rims of wheels in a great many different ways; but no one, so far as I know, has ever designed a construction in which the rubber tire has first been secured to the rim permanently and the rim then secured to the wooden or other felly. Bands have been employed, as well as wire, passing through slots or openings in the tire and the ends of the bands or wire afterward drawn tight and locked to hold the tire in place; but such bands or wires have never been first permanently secured to the rim and the rubber when in a soft state formed into a tire around the band, so that the liability of the tire being displaced or creeping on the rim is absolutely overcome. It is to attain this result that my invention is directed, and it is accomplished by the certain novel process of forming the retaining band or wire as a part of the continuous rim, then molding the tire in a soft state to fit around the band or wire, then vulcanizing the rubber and afterward securing the continuous rim and tire to the felly of the wheel to form a wheel with a rubber tire permanently secured thereto.

Figure 1:
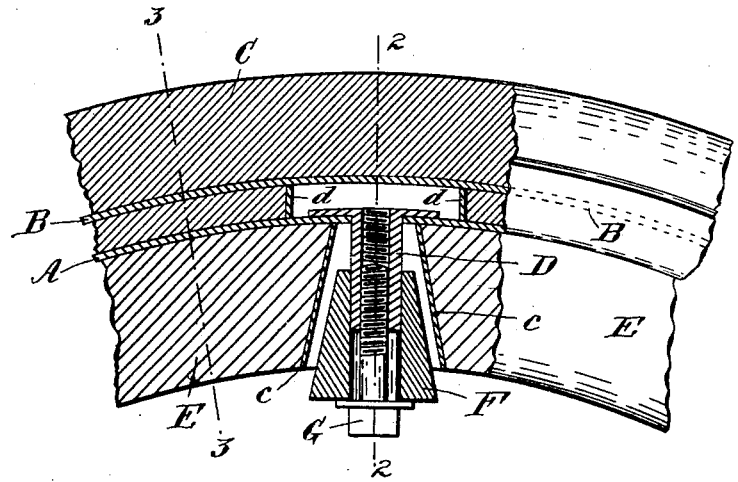
Figure 2:
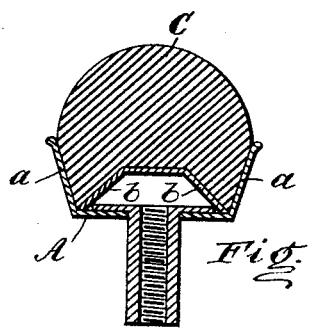
Figure 3:
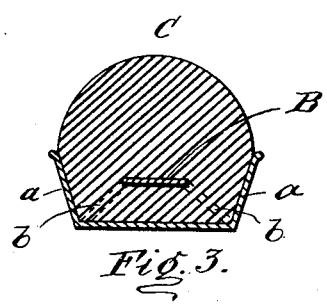

In the drawings, Figure 1 is a longitudinal section through a portion of the wheel felly, tire, and rim. Fig. 2 is a cross-section of the tire and rim, taken on the lines 2 2 of Fig. 1 before the rim is secured to the felly. Fig. 3 is a similar section taken on the lines 3 3 of Fig. 1.

In carrying out my process I first form a metallic rim A of any desired size and shape with side flanges $a\ a$ to receive the rubber tire and provided with a band B, which is permanently secured to the rim at various points in its periphery by the extensions $b\ b$, which are permanently riveted or brazed to the rim. The rim is welded together to form a ring, and the band B also forms a ring, secured, as I have stated, to the rim proper. The rubber is then taken in its soft state before vulcanization and is formed into a rubber tire C around the band B, so as to fill up between the flanges of the rim and extend upward in cylindrical shape in the usual way. When the tire has thus been formed within the rim and under and around the retaining-band, the soft rubber is vulcanized in the usual way to form a suitable quality of rubber for the cushion-tire. The rim being continuous, the soft rubber and rim can be heated and the rubber properly vulcanized without difficulty. After this step in the process we will have a rubber tire permanently secured to a continuous rim, and in order that this rim may then be secured to the wooden felly of the wheel I provide as follows: At a suitable point in the base of the rim an opening is formed, and the nut D is brazed thereto with the central portion of the nut extending inward, while in order to protect this nut from the soft rubber a cap is formed to protect the opening by the metallic side pieces $d\ d$, which coöperate with the extensions $b\ b$ at that point to form a complete inclosure for this nut. A small V-shaped piece is cut out of the felly E at this point, the side edges of the felly being protected by the metal strips $c\ c$, while F is a wedge mounted on the screw-threaded bolt G. This bolt G takes into the screw-threaded recess in the nut D, and by screwing up the bolt the wooden felly is spread apart to tighten same within the rim. Instead of providing only a single one of these wedge-pieces to tighten the felly within the rim two or more wedges may be employed at different points on the felly. The rim is also drilled for the usual tire-bolts, and threaded nuts are brazed to it on the inside to receive the bolts, holes being formed in the wooden felly at the proper points for this purpose and these nuts being protected from the soft rubber by caps formed in the same maner as the cap protecting the nut which receives the wedge-bolt. In this way the rim can be fitted to the felly cold, and by means of the wedge the rim may be made perfectly tight. For metal wheels the same process for securing the tire permanently to the rim can be employed. For securing such rims where the wooden felly is dispensed with and metal spokes are used the rim of the wheel will be drilled and threaded, nuts for the spokes will be brazed on the inside, and to protect these nuts metal caps will be employed in the same manner as with the rim for the wooden wheels, or instead of threaded nuts openings can be left in the base of the rim to lock the ends of the spokes and a union-joint be provided at the hub to draw them tight.

Having thus described my invention, what I claim, and desire to secure by Letters Patent, is—

1. A vehicle-tire having a continuous channel-base of metal, a band within said channel, and means for connecting said band permanently to said channel, and a rubber tread portion fitting said channel and molded around the band, the whole being vulcanized together.

2. A vehicle-tire having a continuous channel-base of metal, a band within said channel and connected thereto by lateral extensions, and a rubber tread portion fitting said channel and molded around the band, the whole being vulcanized together.

3. In a vehicle-wheel, provided with a wooden felly, the combination with a continuous channel-base of metal, of a band within said channel permanently connected thereto, a rubber tread portion fitting said channel and molded around the band, the whole being vulcanized together, with means for securing said metal base cold to the felly.

WILLIAM R. HOWE.

Witnesses:
JOHN ASHTON,
ROBERT MONTGOMERY.